(12) United States Patent
Burhanettin

(10) Patent No.: US 12,074,540 B2
(45) Date of Patent: Aug. 27, 2024

(54) METHOD OF CONTROLLING AT LEAST TWO INTERACTING PIEZOELECTRIC ACTUATORS

(71) Applicant: PHYSIK INSTRUMENTE (PI) GMBH & CO. KG, Karlsruhe (DE)

(72) Inventor: Koc Burhanettin, Ettlingen (DE)

(73) Assignee: PHYSIK INSTRUMENTE (PI) GMBH & CO. KG (DE)

( * ) Notice: Subject to any disclaimer, the term of this patent is extended or adjusted under 35 U.S.C. 154(b) by 152 days.

(21) Appl. No.: 17/912,634

(22) PCT Filed: Mar. 12, 2021

(86) PCT No.: PCT/EP2021/056298
§ 371 (c)(1),
(2) Date: Sep. 19, 2022

(87) PCT Pub. No.: WO2021/190953
PCT Pub. Date: Sep. 30, 2021

(65) Prior Publication Data
US 2023/0188057 A1 Jun. 15, 2023

(30) Foreign Application Priority Data
Mar. 25, 2020 (EP) ..................... 20165674

(51) Int. Cl.
*H02N 2/06* (2006.01)
*H02N 2/02* (2006.01)

(52) U.S. Cl.
CPC ............... *H02N 2/06* (2013.01); *H02N 2/067* (2013.01); *H02N 2/02* (2013.01)

(58) Field of Classification Search
CPC .......... H02N 2/06; H02N 2/025; H02N 2/028; H02N 2/043; H02N 2/067
See application file for complete search history.

(56) References Cited

U.S. PATENT DOCUMENTS 6,337,532 B1 1/2002 Johansson et al.
6,703,762 B1 3/2004 Okada
(Continued)

FOREIGN PATENT DOCUMENTS

| CN | 103306951 B | 11/2015 |
| EP | 2495600 A1 | 9/2012 |
| WO | 2005-122383 A1 | 12/2005 |

OTHER PUBLICATIONS

International Search Report and Written Opinion of the International Searching Authority issued in PCT/EP2021/056298, mailed Apr. 14, 2021; ISA/EP (8 pages).

*Primary Examiner* — Emily P Pham
(74) *Attorney, Agent, or Firm* — Harness, Dickey & Pierce, P.L.C.

(57) ABSTRACT

A method is provided of controlling at least two interacting piezoelectric actuators for commonly displacing an object attached thereto. The method comprises the following steps: a. Step A: applying a first cyclic drive voltage signal with a constant frequency to the first piezoelectric actuator, b. Step B: applying a second cyclic drive voltage signal with a constant frequency to said second piezoelectric actuator, whereby the frequencies of the first and second cyclic drive voltage signals are substantially identical and whereby the frequencies of the first and second cyclic drive voltage signals are substantially oppositely phased, and in which at least in a predetermined time period the cyclic drive voltage signals in step A and B are synchronized such that at least one time phase is comprised in which the drive voltage signals of the first and second piezoelectric actuators have both a gradient of decreasing or increasing the respective drive voltage signal having the same sign or one of these gradients is zero and the other is not zero.

17 Claims, 13 Drawing Sheets

(56) References Cited

U.S. PATENT DOCUMENTS

| 9,692,323 B2* | 6/2017 | Kortschack | H02N 2/06 |
| 2021/0359624 A1* | 11/2021 | Koc | H02N 2/04 |
| 2022/0255467 A1* | 8/2022 | Burhanettin | H02N 2/0025 |

* cited by examiner

METHOD OF CONTROLLING AT LEAST TWO INTERACTING PIEZOELECTRIC ACTUATORS

CROSS REFERENCE TO RELATED APPLICATIONS

This application is a U.S. National Phase Application under 35 U.S.C. 371 of International Application No. PCT/EP2021/056298, filed on Mar. 12, 2021, which claims priority to European Patent Application No. 20165674.1, filed on Mar. 25, 2020. The entire disclosures of the above applications are expressly incorporated by reference herein.

BACKGROUND

U.S. Pat. No. 6,337,532 B1 refers to a fine walking actuator. The corresponding electromechanical actuator arrangement comprises a plurality of drive elements separated by cuts. Each drive element is divided into two separately controllable phase segments. A respective electrode arrangement will result in a bending and/or expansion/contraction of the drive elements. The driving elements are divided into two groups, whereby the driving elements within one group are commonly controlled. The two sets of drive elements are typically phase shifted by 180° but more than two sets of drive elements could be used. One aspect of this design is to make a fine walking by proper electronic control. The gripping sequence of one set overlaps with the releasing sequence of the opposite set.

WO 2005/122383 A1 refers to a piezo-electric actuator that shall especially be used in a mobile device powered by rechargeable battery. The piezo-electric actuator may comprise two independently deflectable piezo-elements, which have been connected together. A protrusion for moving an object is attached near the connection of said two piezo-elements. The degree of deflection of each piezo-elements is changed when a voltage is applied between respective voltage terminals of said piezo-elements.

EP 2 495 600 A1 refers to a driver for optical deflector comprising a mirror, a movable frame an inner piezo-electric actuators to move the mirror with respect to an X-axis. The inner piezo-electric actuators are fixed between a movable frame and torsion bars. Outer piezoelectric actuators are fixed between a support body and the movable frame and serving for rocking the mirror with respect to a Y-axis.

The present invention refers to a method of controlling at least two interacting piezoelectric actuators for commonly displacing an object attached thereto. Such a method is for example used in driving a two-source inertia drive type motor, such as described in EP 3089348 A1. Such a motor may drive a slider by use of a stick slip effect. The two piezoelectric actuators are driven by corresponding cyclic drive voltage signals having a constant frequency. The cyclic drive voltage signals of the two piezoelectric actuators have multiple triangular waveforms and are mirrored so as to commonly move a friction element which is in contact with a slider to be driven. Mainly a tangential trajectory of the driven friction element is provided for by the interaction of the two piezoelectric actuators. In such an inertia drive type motor, movement of the slider takes place because a friction element (contacting points or areas) of the motor moves in one tangential direction slowly, returning and move fast in the opposite direction. The result is a microscopic step of the slider. This microscopic movements are accumulated as the movements of the friction element repeats the sequence. As stated, during these movements the trajectory at the interface is tangential. Unfortunately, there exists instances where a function of such a device is not at optimum.

It is therefore an object of the present invention to provide a more flexible method of controlling at least two interacting piezoelectric actuators for commonly displacing an object attached thereto.

SUMMARY

This object is solved by a method comprising the following steps:
  a. Step A: applying a first cyclic drive voltage signal with a constant frequency to a first piezoelectric actuator,
  b. Step B: applying a second cyclic drive voltage signal with a constant frequency to a second piezoelectric actuator, whereby the frequencies of the first and second cyclic drive voltage signals are substantially identical and whereby the frequencies of the first and second cyclic drive voltage signals are substantially oppositely phased (anticyclic), wherein
    at least in a predetermined time period the cyclic drive voltage signals in step A and B are synchronized such that at least one time-phase is comprised in which the drive voltage signals of the first and second piezoelectric actuators have both a gradient of decreasing or increasing the respective drive voltage signal having the same sign.

Such a method has the benefit of allowing trajectories which are not only tangential or oblique trajectories, but could be other trajectories such as rectangular etc. This allows for more flexibility in controlling such two interacting piezoelectric actuators for commonly displacing an object. With such a method also a specific orientation of the actuators to one another is not needed or can be compensated. For example, if this method is used to control a two-source inertia drive type motor by using a rectangular trajectory at the slider-motor contact points, a better controllability of the slider movements can be obtained. So far, only mirrored triangular waveforms have been used. With the inventive method, one can depart from the pure triangular waveform and also depart from a strict mirrored configuration of the two cyclic drive voltage signals. The term "oppositely phased" or "anticyclic" especially means that within a period (1/frequency) of the drive voltage signals, the first drive voltage signal starts at the base voltage and ends at the base voltage and crosses the base voltage one more time. The second drive voltage signal also starts at the base voltage and ends at the base voltage and crosses the base voltage one more time in between, but in the other direction. Starting point and end point of a period of the first drive voltage signal and the second drive voltage signal are thus prefer ably identical. The method allows the provision of different trajectories by adapting the first cyclic drive voltage signal and a second drive voltage signal to one another in any possible way, irrespective of whether the waveforms are exactly mirrored or differently scaled or have a substantially different shape.

Advantageous further developments are also provided.

It may be advantageous when the method comprises the following time phases (preferably within one period):
  a first time phase in which the drive voltage signal of the first piezoelectric actuator increases from a base voltage to a first upper intermediate voltage lying between the base voltage and a first upper peak voltage or increases from a base voltage to a first upper peak voltage and in which the drive voltage signal from the second piezoelectric actuator decreases from a base voltage to a second lower intermediate voltage lying between the base voltage and a second lower peak voltage or decreases from the base voltage to a second lower peak voltage, a second time phase in which the drive voltage signal of the first piezoelectric actuator increases from the first upper intermediate voltage to the first upper peak voltage or is paused at the first upper peak voltage or decreases from the first upper peak voltage to a first upper intermediate voltage lying between the first upper peak voltage and the base voltage and in which the drive voltage signal from the second piezoelectric actuator increases from the second lower peak voltage to a second lower intermediate voltage lying between the second lower peak voltage and the base voltage to a second lower peak voltage or is paused at the second lower peak voltage or decreases from the second lower intermediate voltage to a second lower peak voltage, whereby in the second time phase the drive voltage signals of the first and second piezoelectric actuators have both a gradient of decreasing or increasing the respective drive voltage signal having the same sign or one of these gradients is zero (e.g. pausing) and the other is not zero or both of these gradients are zero, and a third time phase in which the drive voltage signal of the first piezoelectric actuator decreases from the first upper peak voltage or the first upper intermediate voltage to a first lower intermediate voltage or a first lower peak voltage and in which the drive voltage of the second piezo electric actuator increases from the second lower intermediate voltage or the second lower peak voltage to a second upper intermediate voltage or a second upper peak voltage.

This means that the first piezoelectric actuator increases and the second piezoelectric actuator decreases in length in a first time phase and it also means that the first piezoelectric actuator decreases in length and the second piezoelectric actuator increases in length in the third time phase (or vice versa) while in an intermediate (second) time phase therebetween, the two piezoelectric actuators do not carry out an extension or retraction movement which is in the opposite direction of the other actuator. Then, one actuator may stand still while the other actuator also stands still or moves in a certain direction or both move in the same direction in the second time phase. Such a behavior leads to completely distinct trajectories from what was known in the art. The mentioned time phases follow subsequently according to their number and preferably following one after another without any intermediate time phases. Preferably, in a time phase, the gradient of a drive voltage signal is constant and preferably in subsequent time phases the gradient of the drive voltage signals are different.

It may be useful when the further additional time phases are comprised:

a fourth time phase in which the drive voltage signal of the first piezoelectric actuator increases from the first lower peak voltage to a first lower intermediate voltage lying between the first lower peak voltage and the base voltage or is paused at the first lower peak voltage or decreases from the first lower intermediate voltage to a first lower peak voltage, and in which the drive voltage of the second piezoelectric actuator increases from the second upper intermediate voltage to a second upper peak voltage or is paused at the second upper peak voltage or is decreased from the second upper peak voltage to a second upper intermediate voltage lying between the second upper peak voltage and the base voltage, whereby in the fourth time phase the drive voltage signals of the first and second piezoelectric actuators both have a gradient of decreasing or increasing the respective drive voltage signal having the same sign or one of these gradients is zero and the other is not zero or both of these gradients are zero or whereby the fourth time phase is omitted, and a fifth phase in which the drive voltage signal of the first piezoelectric actuator increases from the first lower intermediate voltage or first lower peak voltage to the base voltage and in which the drive voltage of the second piezoelectric actuator decreases from the second upper inter mediate voltage or the second upper peak voltage to the base voltage.

As in the second time phase, in the fourth time phase the two drive voltage signals do not decrease or increase in an opposite direction. The fourth time phase may for example be used to compensate the motion of the second time phase or to carry out a completely distinct additional interacting movement. It might also be possible to completely omit the fourth time phase, so that the fifth time phase follows the third time phase. The time phases subsequently follow according to their number. Preferably, the time phases immediately follow each other without further intermediate time phases. The only exception might be the fourth time phase which according to an embodiment might be omitted. Preferably, in a time phase, the gradient of a drive voltage signal is constant and preferably in subsequent time phases the gradient of the drive voltage signals are different.

Especially if the piezoelectric actuators shall make a relative slow movement in a certain time phase and a rather fast movement in a third time phase, it is, according to one embodiment, beneficial when the amount of the gradient of increasing or decreasing the drive voltage signal of the first piezoelectric actuator in the second time phase is smaller than the amount of the gradient of decreasing the drive voltage signal of the first piezoelectric actuator the third time phase and/or the amount of increasing or decreasing the drive voltage signal of the second piezoelectric actuator in the second time phase is smaller than the amount of the gradient of increasing the drive voltage of the second piezoelectric actuator in the third phase. Especially in the third time phase, it is required to have a rather fast movement of at least one of the actuators, for example to create a beneficial stick slip effect etc.

In a further embodiment, the amount of the gradient of increasing the drive voltage signal of the first piezoelectric actuator in the first time phase can be different than the amount of the gradient of increasing or decreasing or pausing the drive voltage signal of the first piezoelectric actuator in the second time phase and/or the amount of the gradient of decreasing the drive voltage signal of the second piezoelectric actuator in the first time phase can be different than the amount of the gradient of increasing or decreasing or pausing the drive voltage signal of the second piezoelectric actuator in the second time phase. This leads to different movements of the actuators in these two phases in order to provide for a more beneficial trajectory control.

It might also be possible to use a first and second piezoelectric actuator in a situation where a certain bias is already provided on the actuators in a state where no drive voltage signals are generated. In this regard, it might be beneficial when according to a further variant, the amount of the first upper peak voltage is different than the amount of the first lower peak voltage and/or the amount of the second lower peak voltage. In this way, the motion of the respective actuator is not symmetric relative to a start position. This might for example, avoid over-excessive ap plied forces in a certain direction.

Preferably, the amount of the gradient of increasing or decreasing or pausing the drive voltage signal of the first piezoelectric actuator in the fourth time phase could be different than the amount of the gradient of increasing or decreasing the drive voltage signal of the first piezoelectric actuator in the fifth phase and/or the third time phase and/or the amount of the gradient of increasing or decreasing or pausing the drive voltage signal of the second piezoelectric actuator in the fourth time phase is different than the amount of the gradient of increasing or decreasing the drive voltage signal of the second piezoelectric actuator in the fifth time phase and/or the third time phase. Similar to the second time phase, the expansion or contraction of the respective actuator is carried out with a different velocity in the respective time phases, allowing a better trajectory control which can preferably be adapted to specific applications.

The drive voltage signal of a piezoelectric actuator is itself generated by a combination of respective excitation voltages at a first and a second terminal, which means the drive voltage signal itself is the result of a combination of two excitation voltage profiles. According to a preferred embodiment, the drive voltage signals of the first and second piezoelectric actuators are generated by a cyclic first excitation voltage applied to the first, preferably positive, terminal and a cyclic second excitation voltage applied to the second, preferably negative, terminal of the first and second piezoelectric actuators and that the amount of an upper peak voltage of the cyclic first excitation voltage is higher than the amount of a lower peak voltage of the cyclic first excitation voltage and the amount of the upper peak voltage of the cyclic second excitation voltage is lower than the amount of the upper peak voltage or the amount of the lower peak voltage of the cyclic first excitation voltage. The excitation voltage preferably has the same frequency. In known applications, the excitation voltages are applied in triangular waveforms, whereby the waveform of the excitation voltage at the second terminal has been mirrored to the waveform of the excitation voltage at the first terminal. This resulted in triangular waveforms where the upper and lower peak voltages have been doubled. Contrary thereto, in the present invention the first excitation voltage and the second excitation voltage, although preferably having the same frequency, and also preferably having a somewhat triangular form, it is also possible that they have the same profile in another scale. Preferably, they are two isolated non-identical triangular waveforms. Depending on the magnitude and phase differences of these two waveforms, an actuator is exposed on not only a strict saw-tooth triangular waveform but also other types of waveforms.

For some applications, it might be beneficial when the upper peak voltages of the cyclic first excitation voltage and the upper peak voltages of the cyclic second excitation voltage are synchronized, preferably applied at the same time. It is especially beneficial if one of the excitation voltages only has a single sign (being positive or negative) and the other having within one period positive and negative signs.

It may be proved to be convenient where in one variant the object commonly displaced by and attached to the first and second piezoelectric actuators is at least one friction element of an inertia drive motor, whereby the at least one friction element is configured to, at least in a non-operating state of the first and second piezoelectric actuators, being brought into frictional con tact with an element to be driven.

Such inertia drive motors for example move a slider by contact of at least one frictional element. The movement of such a slider can be improved by applying a trajectory control according to the present invention so as to adapt it to specific applications. More than one motor may commonly drive a slider.

Preferably, the inertia drive motor might comprise an elastic frame, the at least one friction element which is arranged on the elastic frame, and the first and second piezoelectric actuators which are configured to cause by interaction the deformation of the elastic frame by the use of the corresponding driving voltage signals. In such a design, it is possible to use piezoelectric actuators positioned side by side and having a parallel expansion and retraction axis. This eases the construction of such an inertia drive motor.

According to a further embodiment, the first and second piezoelectric actuators may be con figured to displace the at least one friction element, which is in frictional contact with the element to be driven in a forward direction in the first time phase, to retract the at least one friction element from the element to be driven in the second time phase and to displace the at least one friction element in the retracted state in a backward direction in the third time phase. Such a method leads to a reduction of the friction between the friction element and the element to be driven, so that the movement in the backward direction in the third time phase can be made with a reduced or without any frictional contact to the element to be driven. For example, a triangular trajectory might be used. This leads to a better controllability of the movement of the element to be driven (as for example a slider).

According to a further embodiment, it might be possible that the elastic frame is attached to a part of a leverage structure including a post on which the at least one friction element is dis posed, whereby the deformation of the elastic frame caused by interaction of the first and second piezoelectric actuators is amplified and translated to the at least one friction element by the leverage structure. Thus, the step for the movement of the frictional element might be increased with such a structure or the position of such an inertia drive motor might be enhanced.

In a further embodiment, it might be preferred that at least three or preferably four piezoelectric actuators are provided which are configured to commonly displace and being attached to the at least one frictional element, whereby the piezoelectric actuators are controlled by their corresponding drive voltage signals to displace the at least one frictional element in x-direction and the z-direction as well as to retract the at least one friction element from the element to be driven in the y-direction. The x-direction and the z-direction define a plane, which is parallel to the movement of the element to be driven by using more than two actuators in a certain arrangement relative to each other, it is possible to move the element to be driven not only back and forth but also in a cross-wise and combined direction. It is still possible to influence the frictional contact of the friction element to be driven by involving a movement in the y-direction.

It might also be possible that the object commonly displaced by and attached to the first and second piezoelectric actuators is a center mass of a piezoelectric hydraulic actuator. Such a piezoelectric hydraulic actuator uses fluid transfer from one chamber to another by the use of two oppositely working one-way valves. A synchronous motion of the two actuators in the same direction would make only one valve to be opened so liquid transfer would be only in one direction. A respective control is possible with the inventive method.

The present invention also refers to an assembly comprising two interacting first and second piezoelectric actuators, a displaceable object attached to the first and second piezoelectric actuators, means for applying and controlling cyclic drive voltage signals for controlling the interaction of the first and second piezoelectric actuators for displacing the object, wherein the means for applying and controlling are configured to perform the method according to one of the preceding claims. Such a device allows for an adapted trajectory control of a two-source driven object.

In one embodiment of the assembly a drive electronic with two signal sources is provided, whereby each signal source has an active and a passive terminal. Only the active terminals are electrically connected to either the positive or the negative terminals (12a, 12b) of the piezoelectric actuators, and the others of the positive or the negative terminals (12a, 12b) of the piezoelectric actuators are electrically connected to each other so that they are floating. The passive terminals of the two signal sources are connected to ground. In result the two piezoelectric actuators are electrically connected in serial. Such a configuration simplifies the drive electronic, because only two wires are going from the signal sources to the respective piezoelectric actuators.

BRIEF DESCRIPTION OF THE DRAWINGS

In the following, multiple embodiments of the present invention are described and shown in conjunction with the attached figures, in which.

DETAILED DESCRIPTION

Figure 1:
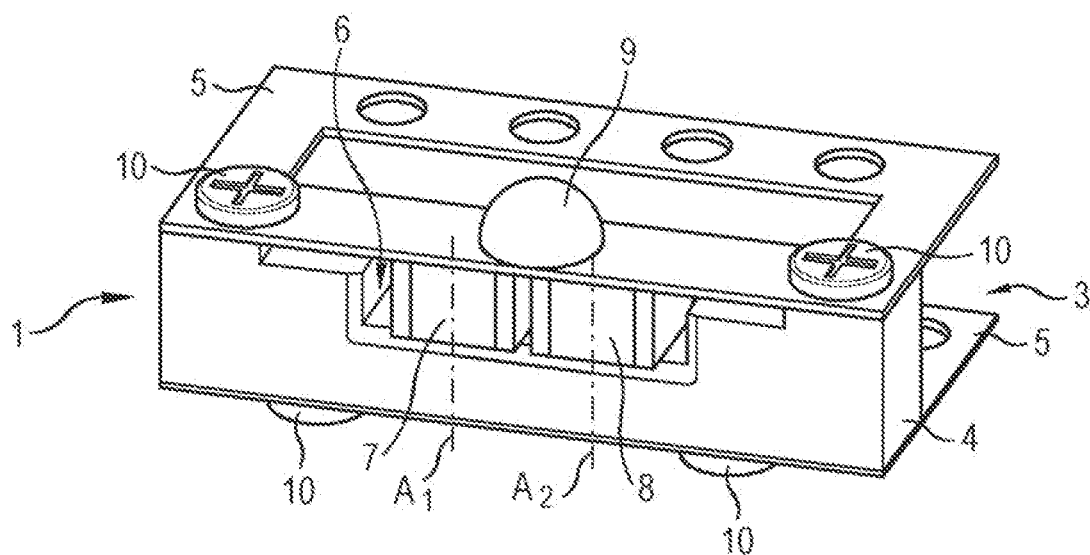
FIG. 1 is a perspective view of the first embodiment of an inertia drive type motor.
Figure 2:
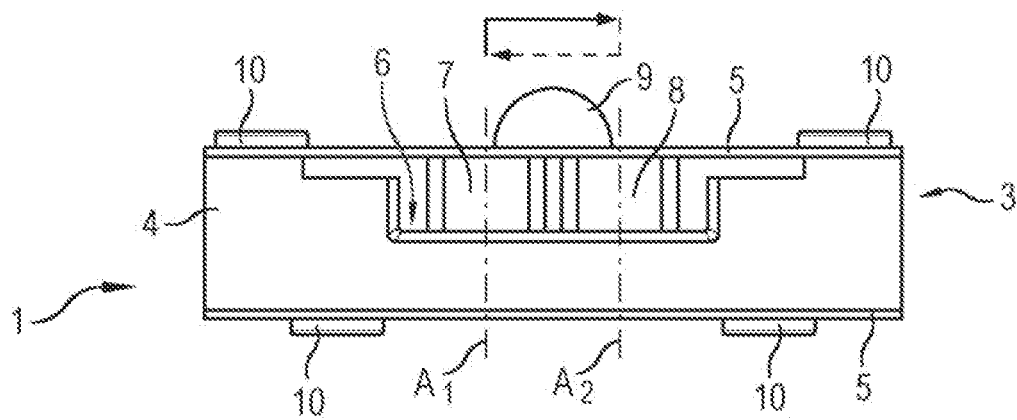
FIG. 2 is a front view of the motor FIG. 1 and indicates a possible rectangular trajectory.
Figure 3:
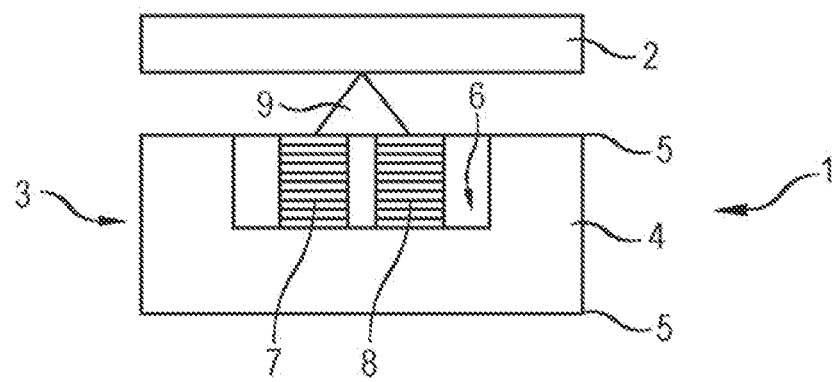
FIG. 3 is a schematic drawing of a two-source inertia drive type motor similar to FIG. 1 an showing the contact with a slider.
Figure 4:
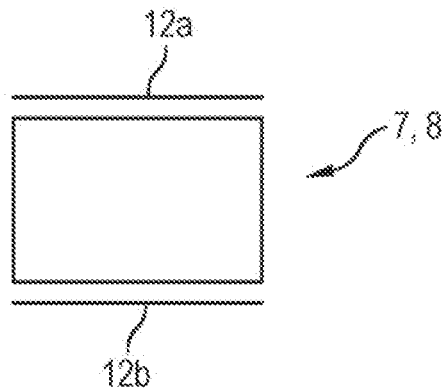
FIG. 4 is a schematic side view of a piezoelectric actuator.

In FIGS. 1, 2 and 3, a first embodiment of an inertia drive type motor 1 is shown. Such an inertia drive type motor 1 is used to move a slider 2 (see FIG. 3) by way of microscopic movements at the motor-slider contact points. The inertia drive type motor 1 has an elastic frame 3 comprising an elastic base element 4 and two or multiple frame-like flat springs 5 attached on either side of the base element 4 so that only one longitudinal side of either spring 5 is in contact with the base element 4. The base element 4 provides for a recess 6, which is bridged by one longitudinal side of the upper frame-like flat spring 5. Two piezoelectric actuators 7 and 8 are sandwiched between the upper flat spring 5 and the bottom of the recess 6 of the base element 4 in a somewhat biased configuration. Exactly in the middle between the two piezoelectric actuators 7 and 8, a friction element (tip) 9 is attached to one side of the upper flat spring 5 so that it projects upwardly and in use contacts the underside of the slider 2 in a biased configuration. The two piezoelectric actuators, 7 and 8, which are placed side by side, have upright actuation directions Ai and A2 that extend perpendicular to the flat springs 5. The flat springs 5 are attached to the base element 4 by using screws 10.

By driving the piezoelectric actuators 7 and 8 in a specific fashion, the friction element 9 (or coupler) carries out a back and forth movement in order to move the slider 2. This is possible due to a stick-slip effect by using different velocities in the forward and backward movement.

Figure 6:
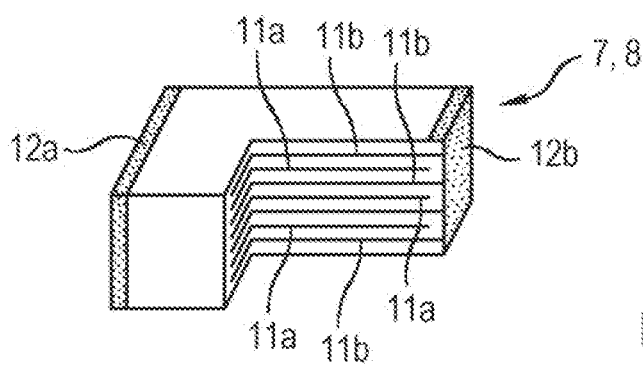

In the embodiment shown in FIGS. 1 to 3, piezoelectric actuators 7 and 8 are used which are of a multilayer type. Such an actuator is shown in FIG. 6. The cutoff section shows the internal electrode connectivity from the internal electrodes 11a and 11b to the outside electrodes or terminals 12a and 12b.

Figure 5A:
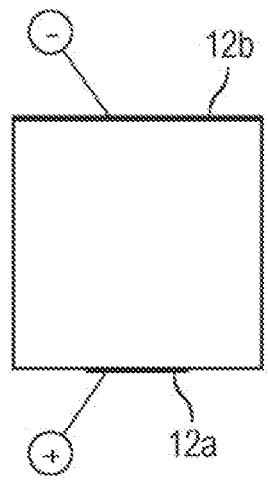
FIG. 5a is a schematic side view of a second embodiment of a piezoelectric actuator.
Figure 5B:
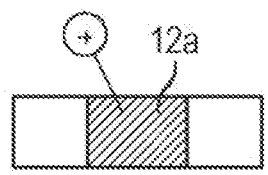
FIG. 5b is a view from below of the piezoelectric actuator of FIG. 5a FIG. 6 is a perspective view of a piezoelectric multilayer actuator partially cut away.

Alternatively, single layer piezoelectric actuators with a positive terminal 12a and a negative terminal 12b might be used. FIGS. 5a and 5b show an alternative configuration of piezoelectric actuators 7 and 8 with a multilayer configuration and their corresponding positive and negative terminals 12a and 12b.

Figure 7:
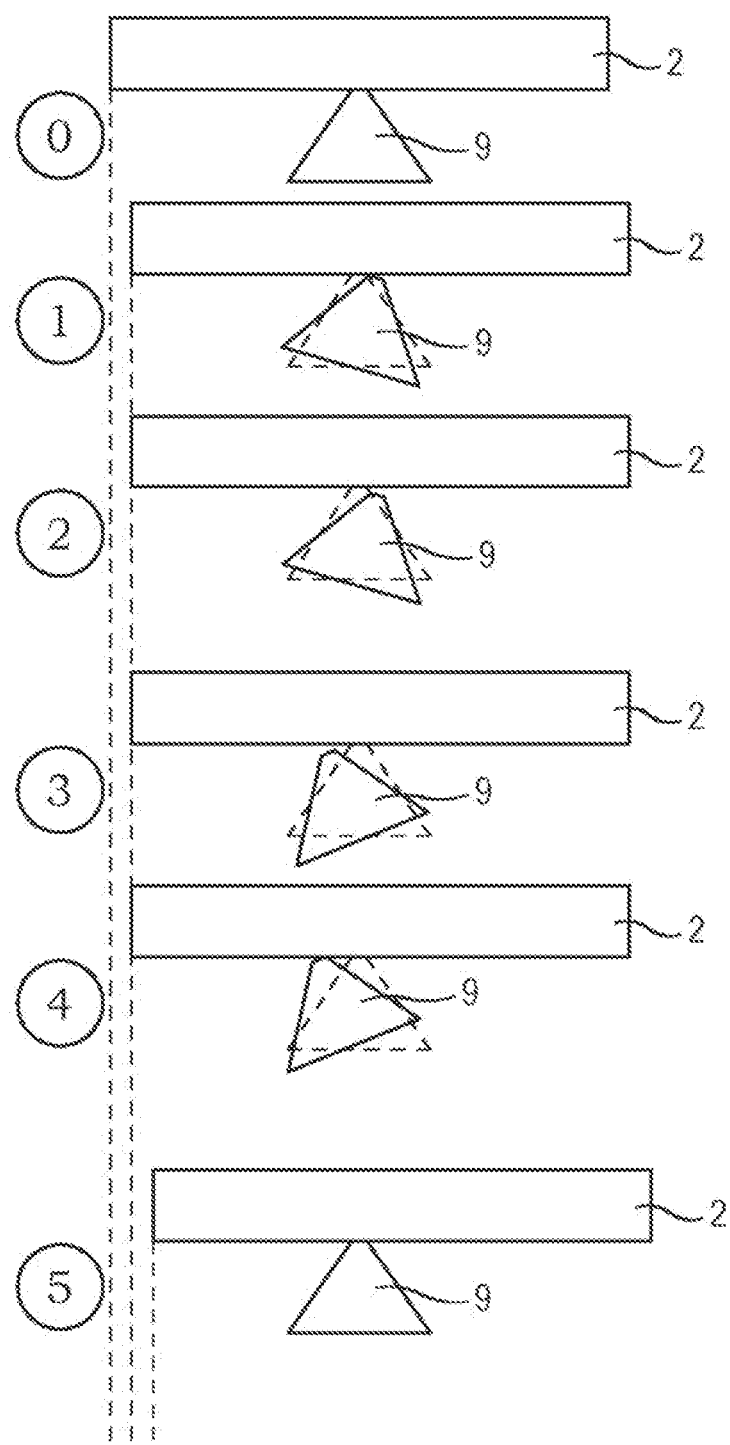
FIG. 7 is a schematic sketch of the driving steps in an inertia drive type motor, FIG. 8 are schematic diagrams of the drive voltage signals of the two actuators in the corresponding steps of FIG. 7.

In conjunction with FIG. 7, the operation of the inertia drive type motor 1 as shown in FIGS. 1 to 3 is described in more detail.

In FIG. 7, the movement of the friction element 9 of the inertia drive type motor 1 is shown in six subsequent steps, which are carried out by the inertia drive type motor 1 during one excitation period of the first and second piezoelectric actuators 7 and 8. The forward movement of the friction element 9 occurs due to a synchronized expansion and contraction of the first and second piezoelectric actuators 7 and 8 due to their corresponding and also synchronized cyclic drive voltage signals 13 and 14 (see FIG. 8).

In step 0, the friction element 9 is at its natural (not tilted) position. This corresponds to step 0 in FIG. 8 where both the first drive voltage signal 13 and the second drive voltage signal 14 have the amount of 0 volts, which is, in this configuration the base voltage 15a and 15b. Both actuators 7 and 8 have their neutral position, which means they are neither expanded nor contracted so that the elastic frame 3 is not deformed. In step 1, the friction element 9 is slowly tilted in the forward direction due to bending of the elastic frame 3. The slider 2 also moves together with the friction tip 9. The movement between step 0 and step 1 is done by a slow increase of the first drive voltage signal 13 from the base voltage 15a to a first upper peak voltage 16a. The increase is linear and has a gradient which is positive because the first upper peak voltage is also positive. The gradient is the quotient of the voltage change in a specific time phase.

The voltage changes which occur during two subsequent steps are drawn in solid lines, whereas the remaining parts of the drive voltage signal in the period are drawn in a dashed line.

At the same time (first time phase), the second drive voltage signal 14 decreases from the base voltage 15b to a second lower intermediate voltage 17b. The voltage change is linearly and the corresponding gradient is negative. The amount of the upper peak voltage 16a and the amount of the second lower intermediate voltage 17b is in this embodiment identical.

In step 2, the friction element 9 has moved back fast in a normal direction and it is thus retracted and escapes from the slider 2 (in other embodiments only the friction or bias between the friction element 9 and the slider 2 might be reduced). This movement of the friction element 9 is due to a decrease of the first drive voltage signal 13 in a second time period from the first upper peak voltage 16a to a first upper intermediate voltage 18a, the gradient in this second time phase is negative. In the same second time phase, the second drive voltage signal 14 decreases from the second lower intermediate voltage 17b to a second lower peak voltage 19b. The gradient of the second drive voltage signal 14 in the second time phase is also negative (has the same sign as the gradient of the first drive voltage signal 13). Both gradients in the second time phase are identical and the amount is larger than the amount of the gradient in the first time phase.

In a third step, the friction element 9 has made a rather fast reverse (backward) movement without any disturbance of the slider 2. Contrary to known driving concepts of such friction elements, frictional non-linearities which might disturb the slider movement are avoided. The fast reverse movement is due to a fast change of the first and second drive voltage signals 13 and 14 in a third time phase. In the third time phase, the first drive voltage signal 13 decreases from the first upper intermediate voltage 18a to a first lower peak voltage 19a. The gradient of the first drive voltage signal 13 in the third time phase is negative and the amount of this is larger than the amount of the gradients in the first time phase and the second time phase. In correspondence thereto, the second drive voltage signal 14 increases rather fast from the second lower peak voltage 19b to a second upper intermediate voltage 18b in the third time phase. The gradient has a positive sign and the amount of it is larger than in the first and the second time phase.

In the fourth step, the friction element 9 moves forward in a normal direction and again contacts the slider 2 so that it is again engaged with the slider 2. This movement occurs from the wave forms of the first and second drive voltage signals 13 and 14 in the fourth time phase. The first drive voltage signal 13 increases from the first lower peak voltage 19a to a first lower intermediate voltage 17a in the fourth time phase. The respective gradient is positive and the amount is identical to the amount in the gradient in the second time phase. The corresponding second drive voltage signal 14 increases from the second upper intermediate voltage 18b to the second upper peak voltage 16b in the fourth time phase. The sign of the gradient in the fourth time phase is also positive for the second drive voltage signal 14 (has the same sign as the gradient of the first drive voltage signal 13).

In the fifth step, the friction element 9 has come back to its natural position by way of a forward movement. This is done by means of a first drive voltage signal 13, which increases from the first lower intermediate voltage 17a to the base voltage 15a. The corresponding gradient in the fifth time phase is positive and its amount is lower than in the third and the fourth time phase. The corresponding second drive voltage signal 14 decreases from the second upper peak voltage 16b to the base voltage 15b in the fifth time phase. The sign of the gradient is negative and its amount is smaller than the amount in the third and the fourth time phase.

Figure 8:
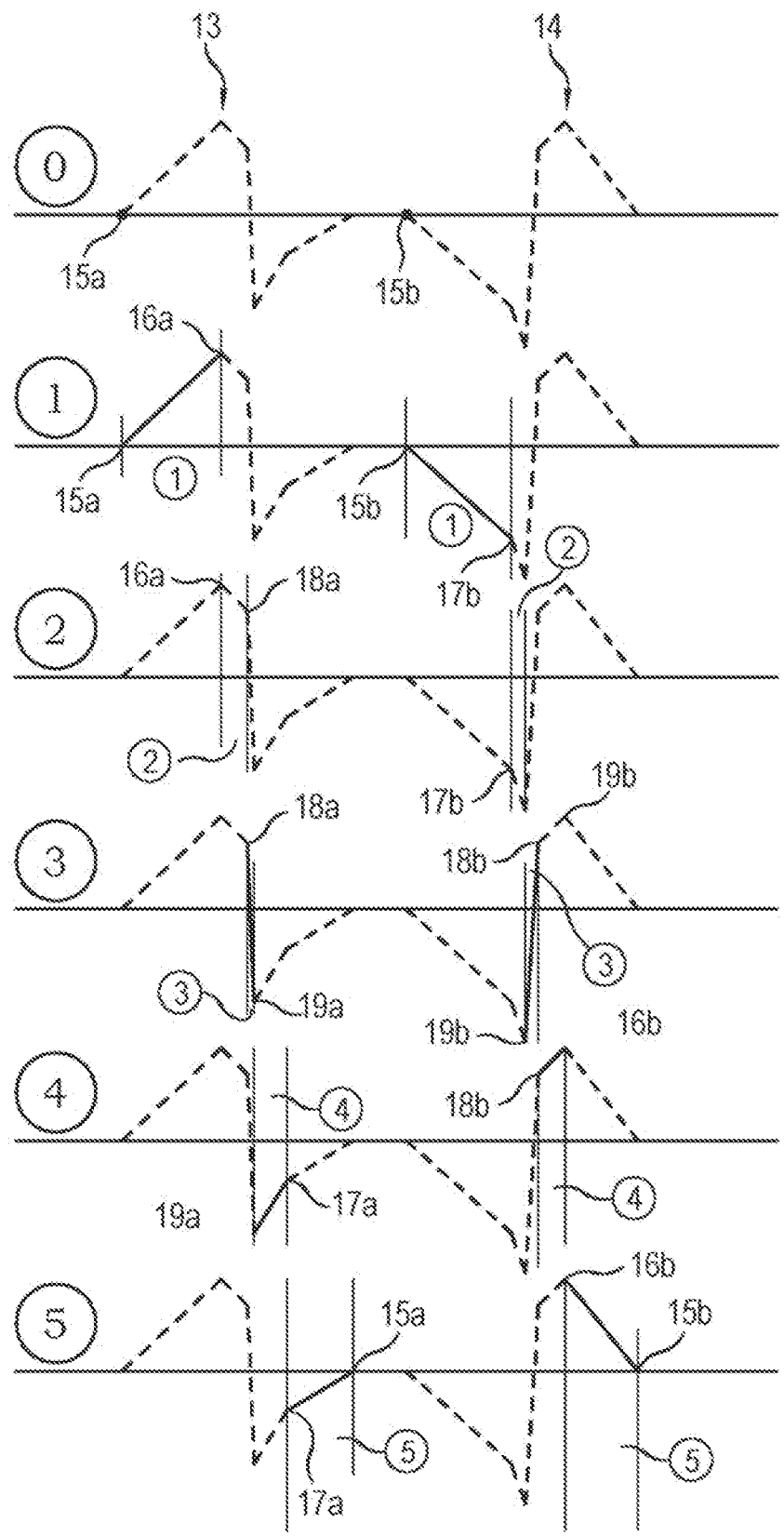

It should be noted that in FIG. 8, one period (1/frequency) of the first drive voltage signal 13 and the corresponding one period (1/frequency) of the second drive voltage signal 14 is shown. The first and the second drive voltage signals 13 and 14 are thus synchronized and substantially oppositely phased or anticyclic. Each of these signals meets the corresponding base voltage 15a or 15b three times, at the beginning of the period and at the end of the period and one time somewhere in the middle. It is important to note that in the first, the third and the fifth time phase, the gradients of the first drive voltage signal 13 and the second drive voltage signal 14 have an opposite sign and in the second and the fourth time phase, the gradients of the first and second drive voltage signals 13 and 14 both have the same sign. As long as the drive voltage signal 14 is positive (above the base voltage) the corresponding piezoelectric actuator 7 or 8 is in an expanded state and as long as the corresponding drive voltage signal 13 or 14 is negative, the corresponding piezoelectric actuator 7 or 8 is in a contracted state. The gradients are kept identical within a time phase.

The interaction of the first and second piezoelectric actuators 7 or 8 leads to a wanted deformation of the elastic frame 3 and thus to a corresponding movement of the friction element 9 in a forward and a backward direction as well as to a slight movement in a direction perpendicular thereto, so that the friction element 9 is detached from the slider 2 or brought into engagement with the slider 2. By the use of the drive voltage signals 13 and 14 as shown in FIG. 8, not only a tangential or oblique trajectory of the friction element 9 is possible but a rectangular movement of the friction element 9 as depicted in FIG. 2 above the friction element 9. As can especially be seen in FIG. 7, the slider 2 is moved in two steps forward in each period of the first and the second drive voltage signals 13 and 14. It should be noted that larger motor structures can be created by the use of multiple inertia drive type motors 1 for commonly driving a slider 2.

Figure 9A:
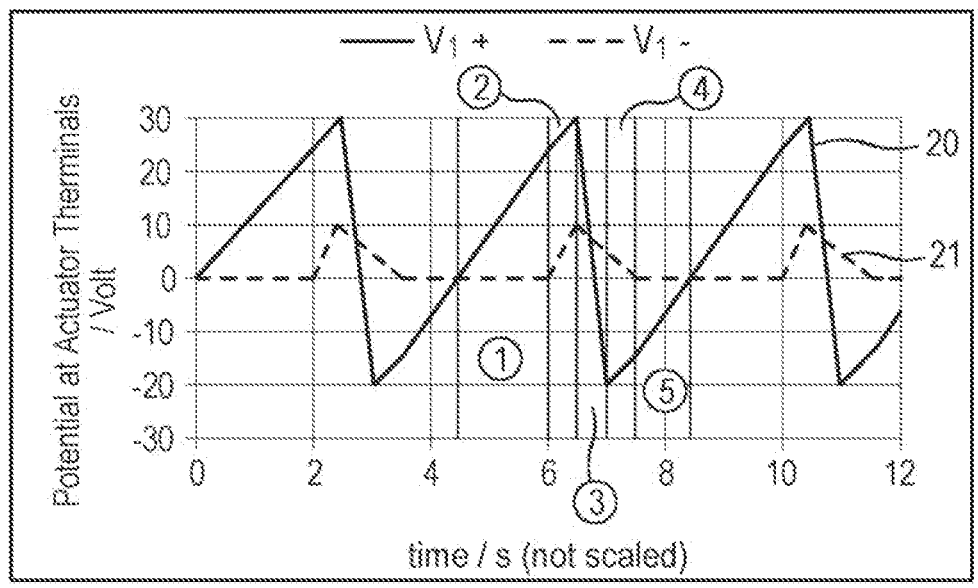
FIG. 9a is a diagram of the first and second excitation voltages of a first piezoelectric actuator in an inertia drive motor.
Figure 9B:
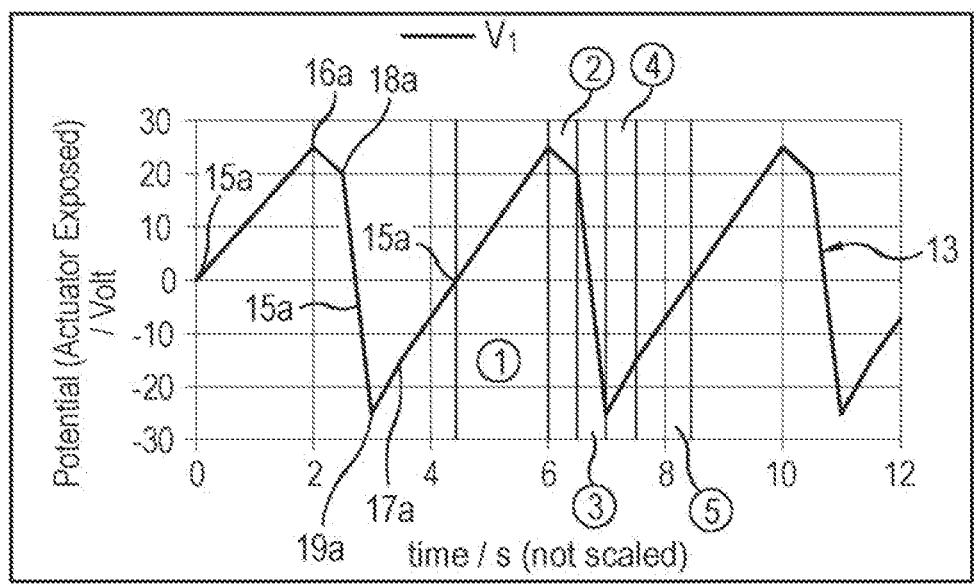
FIG. 9b is a diagram of the resulting drive voltage signal for the first piezoelectric actuator.
Figure 10A:
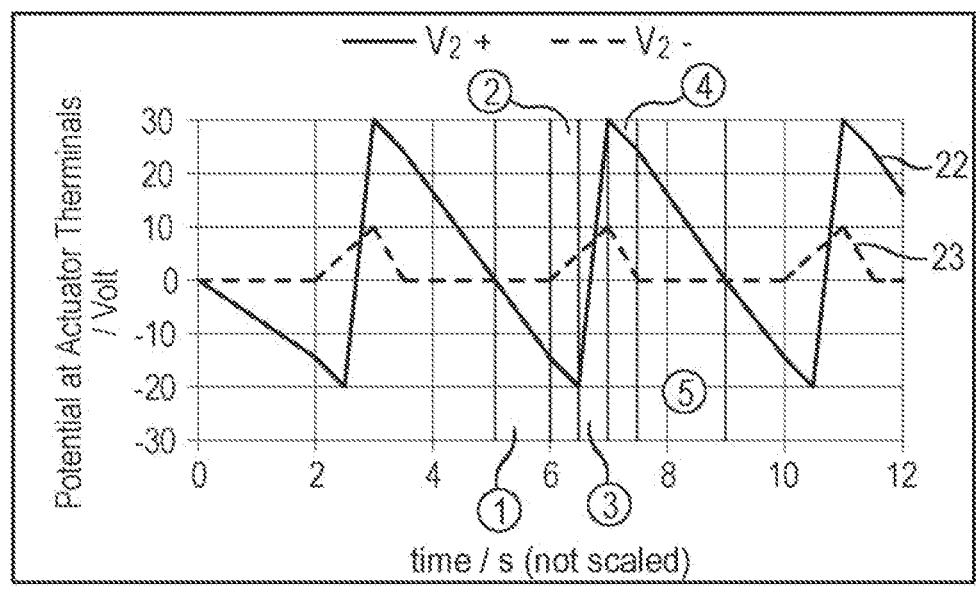
FIG. 10a is a diagram of the first and second excitation voltages of the second piezoelectric actuator.
Figure 10B:
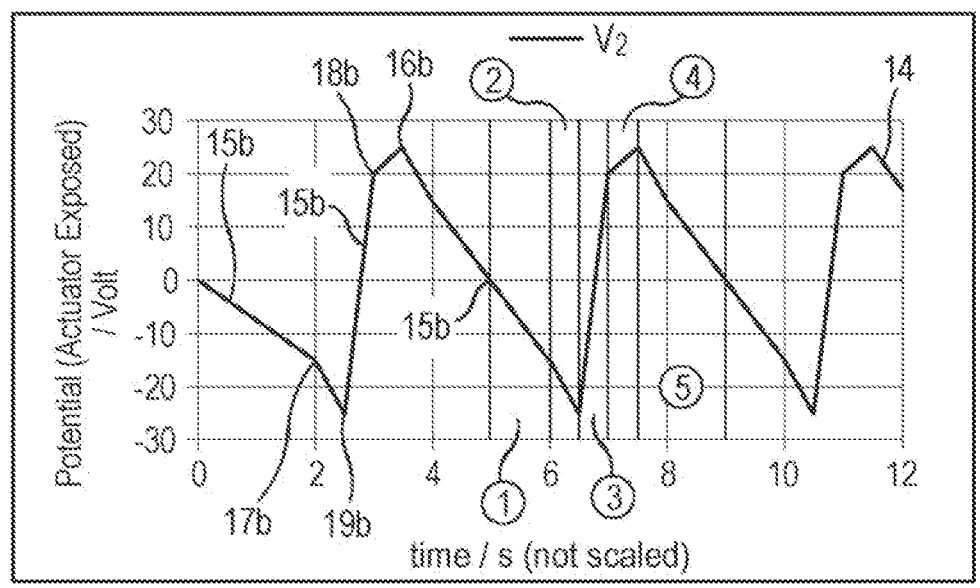
FIG. 10b is a diagram of the resulting drive voltage signal for the second piezoelectric actuator.

FIGS. 9a and 9b as well as FIGS. 10a and 10b explain how the first drive voltage signals 13 and the second drive voltage signals 14 are applied at the corresponding first and second piezoelectric actuator 7 or 8. FIG. 9a shows in solid line a triangular waveform of a cyclic first excitation voltage 20 applied at the first (positive) terminal 12a of the first piezoelectric actuator 7 and in a dashed line a cyclic second excitation voltage 21 applied at the second (negative) terminal 12b of the first piezoelectric actuator 7. This cyclic second excitation voltage is also a saw tooth waveform but has only values between zero and a positive peak voltage, in the present case 10V. The cyclic first excitation voltage 20 has a higher positive peak voltage (30V), than the lower peak voltage (−20V). The peak voltage of the cyclic second excitation voltage 21 occurs at the same time as the upper peak voltage of the cyclic first excitation voltage 20. The cyclic first excitation voltage 20 at the first terminal 20a and the cyclic second excitation voltage 21 at the second terminal 12b result in the first drive voltage signals 13 as shown in FIG. 9b. If the waveforms are used as shown in FIG. 9a and applied to the positive terminal 12a and negative terminal 12b, then the resulting drive voltage signals for the first piezoelectric actuators 7 is Vi=(Vi+)−(Vi−).

Similarly, FIGS. 10 and 10b show the corresponding cyclic first excitation voltage 22 and the cyclic second excitation voltage 23 for the second piezoelectric actuator 8 and the corresponding second drive voltage signals 14 (FIG. 10b). Also here, the waveforms applied to the positive terminal 12a (shown in solid line (V2+)) and applied to the negative terminal 12b (shown in dashed line (V2−)) result in the second drive voltage signals 14 (V2) shown in FIG. 10b.

As a result, the potentials at positive and negative terminals 12a and 12b of a piezoelectric actuator 7 or 8 in an inertia drive type motor 1 are two isolated non-identical triangular wave forms. Depending on the magnitude and phase differences of these two waveforms, an actuator 7 or 8 is exposed not on only a saw-tooth triangular waveform, but also other types of waveforms. As a result, above-mentioned trajectories such as a rectangular trajectory at the slider-motor contact points can be generated, which can lead to better controllability of a slider movement.

The above-described operation of the inertia drive type motor 1 by actuating the first and second piezoelectric actuators 7 and 8 by the use of the described first and second drive voltage signals 13 and 14, provides for a precise movement of a slider 2 by avoiding a disturbance of this movement due to frictional non-linearities. Especially in the third time phase when the friction element 9 is moved backwards rather fast, the described method avoids friction during this backward movement due to the retraction of the friction element 9 in the second time phase. It is also possible to only reduce the friction between the friction element 9 and the slider 2 in the second time phase in order to avoid frictional non-linearities to a certain extent (for example, more than 25%, preferably more than 50% less friction compared to the neutral position of the friction element 9).

When driving the inertia drive type motor 1, it is important that voltages on piezoelectric actuators 7 and 8 start to rise or fall from, for example, 0V (base voltage) to their maximum or minimum values and at the end of each period return to 0V (base voltage) for example. The reason is to keep the friction element at its natural position at the beginning and end of a period. Slip-phase rise and fall times with such driving waveforms are preferably in the middle of the period. This waveform is the most general of the driving waveforms. The magnitudes at the beginning and the end of a period are usually at 0V (base voltage). Most of the time, the magnitudes of the intermediate voltages and the corresponding peak voltages can be set independently at different values, but often they might also be equal.

In the following, it is referred to FIGS. 11 to 14. These figures show diagrams of a first drive voltage signal 13 and the corresponding second drive voltage signal 14 for different applications. These waveforms can also be used in other piezoelectric driven devices, where two piezoelectric actuators are correspondingly used. In order to create different trajectories from the one explained above in conjunction with FIG. 8.

Figure 11:
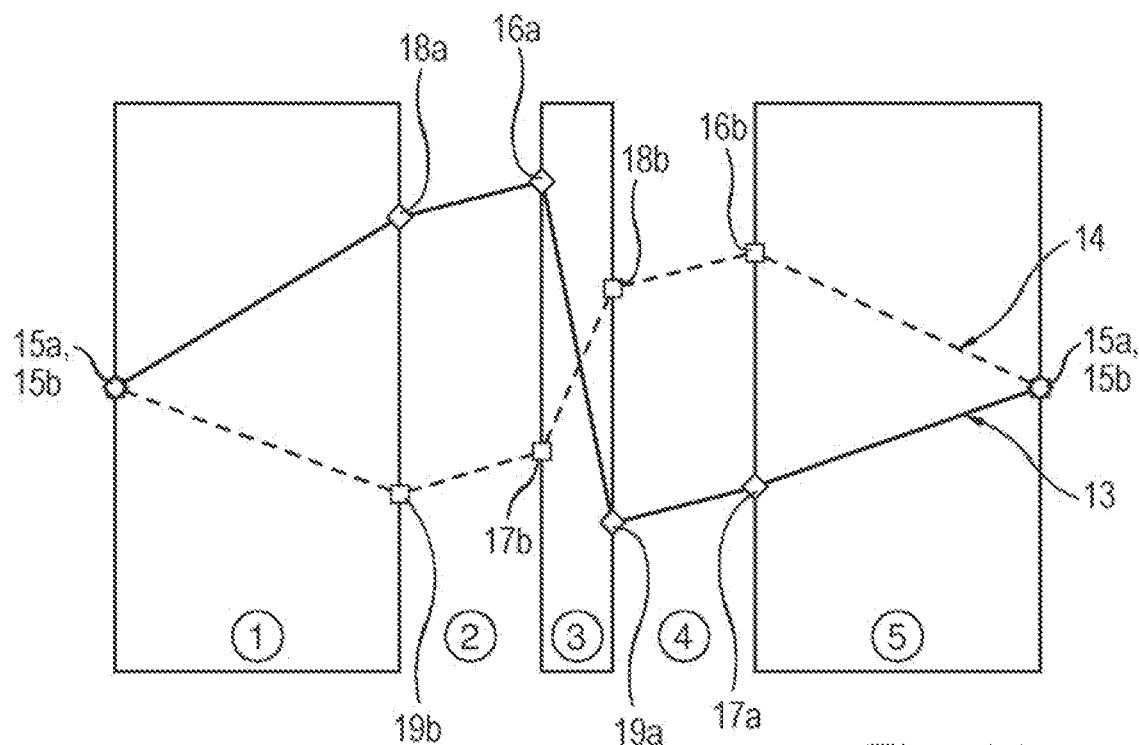
FIG. 11 is a diagram of alternative first and second drive voltage signals.

Again, the waveforms of one period are divided into five time phases. In FIG. 11, in the second and fourth time phase, the rate of change of magnitudes (gradients) have the same signs. Here, in both the second and the fourth time phases, the sign is positive (+). In the first, third and fifth time phases, the rate of change of magnitudes (gradients) have different signs and the rate of change is different, which means the amount of a respective gradient in each of these time phases is different.

Figure 12:
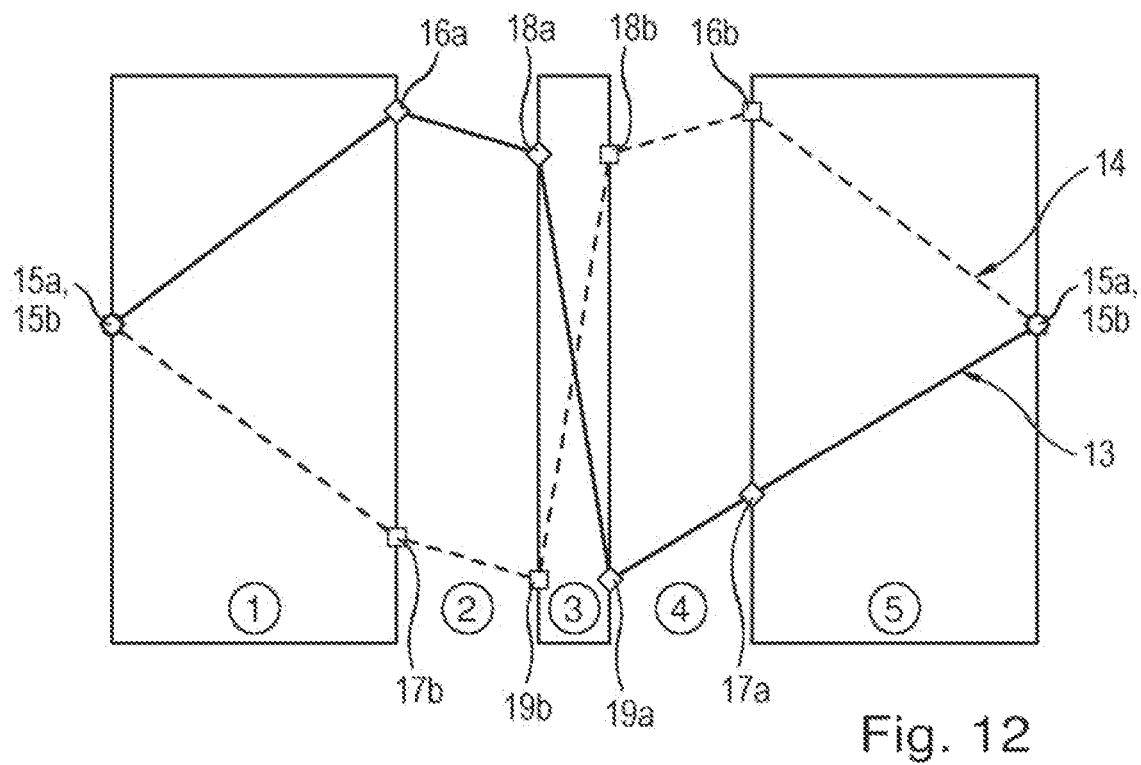
FIG. 12 is a diagram of the further alternative of the first and second drive voltage signals.

Turning to FIG. 12, the waveforms for the first and second drive voltage signal 13 and 14 for a further embodiment are shown. In the second and the fourth time phases, the gradient of the first drive voltage signal 13 and the second drive voltage signal 14 both have the same sign. In the second time phase, the sign of both gradients is negative and in the fourth time phase the sign of the gradients are both positive. In the first, third and fifth time phases, the gradient of the first and second drive voltage signals 13 and 14 are always the opposite. In the first time phase, the amount of the gradient is identical so that the first upper peak voltage 16a has the same amount as the second lower intermediate voltage 17b. The second lower peak voltage 19b is identical to the first lower peak voltage 19a. The first upper intermediate voltage 18a is identical to the second upper intermediate voltage 18b.

Figure 13:
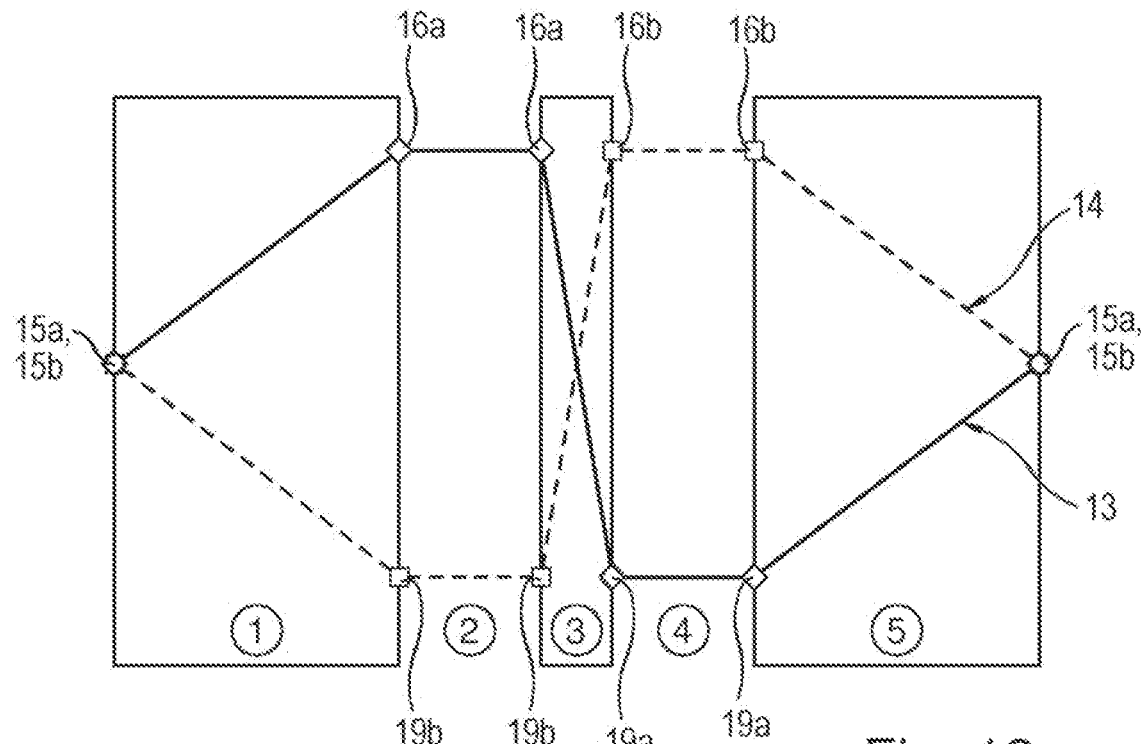
FIG. 13 is a diagram of a further alternative of the first and second drive voltage signals.

A further variant is shown in FIG. 13. The first and the second drive voltage signals 13 and 14 are mirrored at the base voltage line. In the second time phase, the first voltage signal 13 is paused at the first upper peak voltage 16a and the second drive voltage signal 14 is paused at the second lower peak voltage 19b. In the fourth time phase, the second drive voltage signal 14 is paused at the second upper peak voltage 16b and the first drive voltage signal 13 is paused at the first lower peak voltage 19a. As a result, the gradient of both drive voltage signals 13 and 14 is zero. In the first, third and fifth time phases, the sign of the gradients of the first and the second drive voltage signals 13 and 14 are always the opposite, but the amount of the gradient is respectively identical in each time phase.

Figure 14:
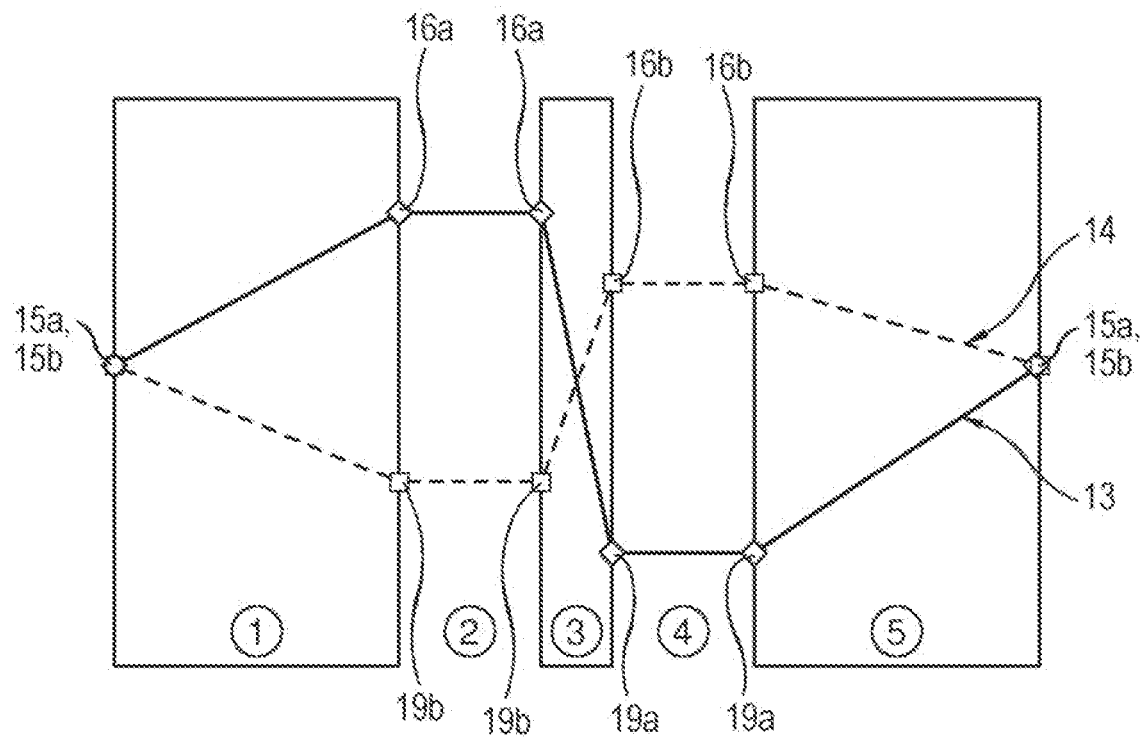
FIG. 14 is a diagram of a further alternative of the first and second drive voltage signals.

In FIG. 14, a further embodiment of the drive voltage signals 13 and 14 is disclosed. Again, in the second and the fourth time phases, the gradient of the both drive voltage signals 13 and 14 is zero. In the remaining time phases, the sign of both gradients of the first and the second drive voltage signals 13 and 14 is respectively the opposite. In addition thereto, in the first, third and fifth time phases, the rate of change (the amount of the gradient) is different in the waveforms of the first and the second drive voltage signals 13 and 14.

FIGS. 11 to 14 in combination with FIG. 8 show that there exists plenty of varieties in modifying the waveforms of the first and the second drive voltage signals 13 and 14. The gradients in each time phase can be different and at least in one time phase, the signs of the gradients are the same or one of these gradients is zero and the other is not zero or both of these gradients are zero. In all other time phases, reasonable changes and variations can be used. It is also possible to extend or compress these time phases or even omit one of the time phases. Especially the fourth time phase might be omitted as for example in one of the embodiments as shown in FIGS. 13 and 14 so that the corresponding drive voltage signal 13 or 14 is not paused at the respective peak voltage 16a, 16b, 19a or 19b. The above described and all other modifications of the drive voltage signals are made by the use of corresponding cyclic first and second excitation voltages according to the principles as explained with regard to FIGS. 9a, 9b, 10a and 10b. As a result, it is possible to adapt the trajectories of a friction element 9 by the interaction of two or more piezoelectric actuators according to any possible trajectory which can be created by the modulation of the waveforms as described herein.

Figure 15A:
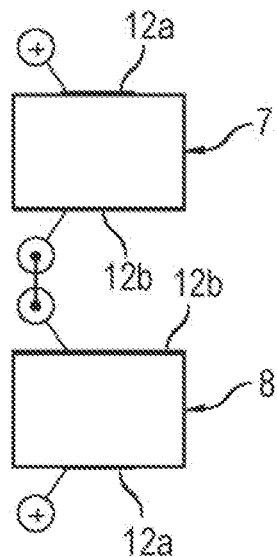
FIG. 15a is a schematic side view of an alternative connection of the two piezoelectric actuators.
Figure 15B:
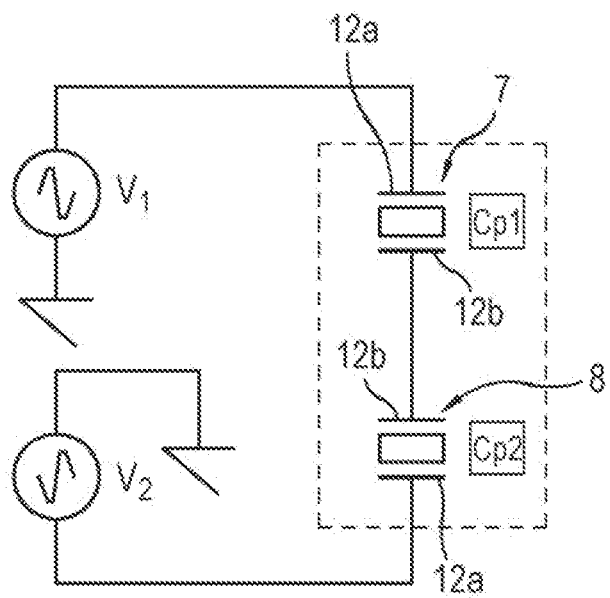
FIG. 15b is a schematic side view of an alternative connection only positive terminals 12a are connected to the drive electronics and the other wires of the signals sources are terminated or grounded in the drive electronics.

Usually, the first and second piezoelectric actuators 7 and 8 are independently excited by the corresponding first and second excitation voltages 13 and 14. In FIG. 15a, a configuration is shown in which only two wires are going through the drive electronics for supplying the corresponding drive voltage signals 13 and 14 to the first and second piezoelectric actuators 7 and 8 respectively. The negative terminals 12b are electrically connected to each other and they are floating. The positive terminals 12a are connected to the drive electronics as seen in FIG. 15b. Since the negative terminals 12b are not connected to the drive electronics, but floating, the two piezoelectric actuators 7 and 8 are driven as if there is only one actuator. For this driving configuration there are two major benefits:

First, the drivers will see a small capacitance while the two piezoelectric actuators 7 and 8 are connected in series. Secondly, the other benefit is that only two wires are connected to the control electronic as if only one piezoelectric actuator is used in the inertia drive type motor 1. To summarize, the negative terminals 12b of both piezoelectric actuators 7 and 8 are shorted electrically to each other and not connected to anywhere. This configuration can be used with any of the previously described two waveforms 13 and 14 as illustrated in FIGS. 11, 12, 13 and 14. However, potential difference between these two waveforms will be shared by the two actuators equally. Waveforms apply to the positive terminals 12a of the two piezoelectric actuators 7 and 8 are identical, but mirrored, thus gradients of the signals can be always equal but in opposite signs or zero.

Figure 16A:
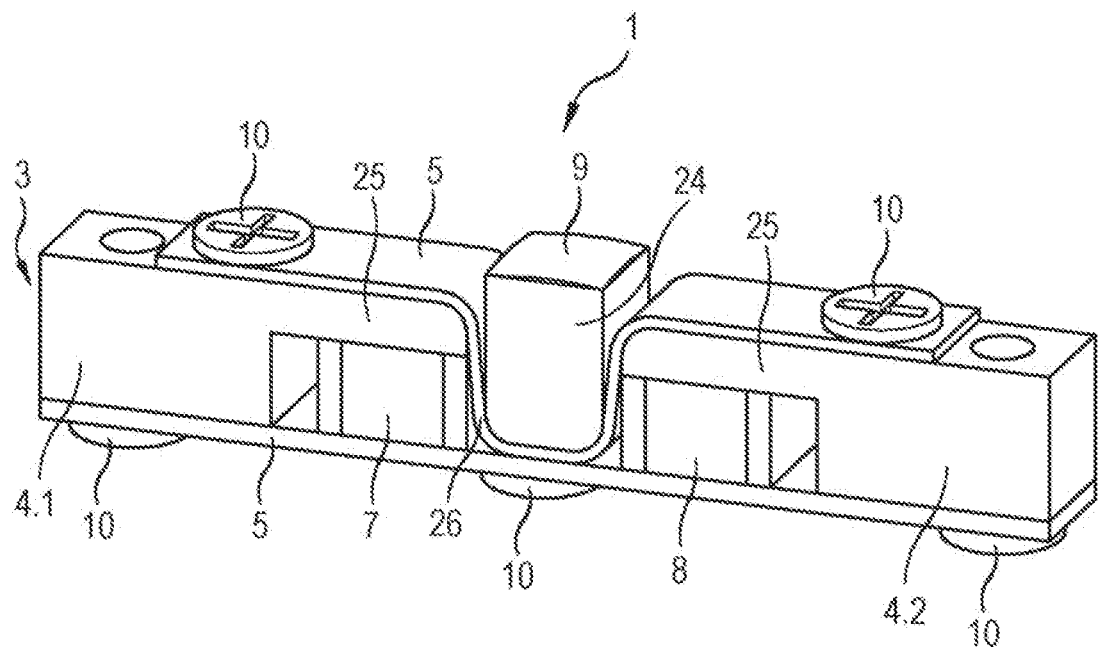
FIG. 16a is a perspective view of an alternative configuration of an inertia drive type motor.
Figure 16B:
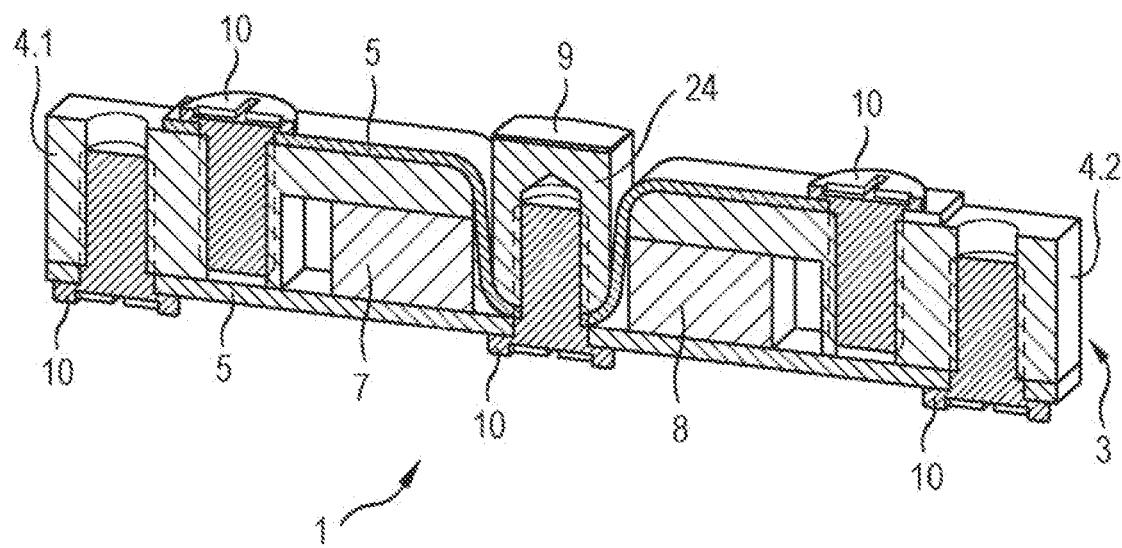
FIG. 16b is a perspective view of a square section of the inertia drive type motor of FIG. 16a, FIG. 17a is a perspective view of an alternative embodiment of an inertia drive type motor.

In the following, a further embodiment of an inertia drive type motor 1 is shown in FIGS. 16a and 16b. In the embodiment shown, a leverage structure is used which includes a post 24, on which the friction element 9 is positioned. The post 24 is located between the two piezoelectric actuators 7 and 8, the elastic frame 3 of the inertia drive type motors 1 comprises two base elements 4.1 and 4.2 (end masses). The piezoelectric actuators 7 and 8 are thus sandwiched between an arm 25 of the base elements 4.1 and 4.2 and a lower flat spring 5. The upper spring 5 has a U or V-shaped middle section 26 on which the post 24 is positioned. The lower part of middle section 26 nearly touches the lower flat spring 5 with a small gap still in between. Screws 10 attach the upper spring 5 to the base elements 4.1 and 4.2 as well as the lower spring 5 to the base elements 4.1 and 4.2 as well as the post 24 and the middle section 26 to the upper spring 5. When the two piezoelectric actuators 7 and 8 are electrically excited at 180° out of phase their movements in the length (or thickness) directions are anti-symmetric. These anti-symmetric movements are transferred to the post 24 and the friction element 9 as a rocking movement. By using drive voltage signals as described above, modification of the trajectories provided for by the friction element 9 can be made.

Even if the parts are combined with screws 10, other combination methods such as welding or epoxy bonding methods can also be used. A separate friction element is not necessarily needed. The post 24 itself could provide for the respective function. For example, it is also possible to use as a friction element ceramic material structures attached to the end of the post 24.

Figure 17A:
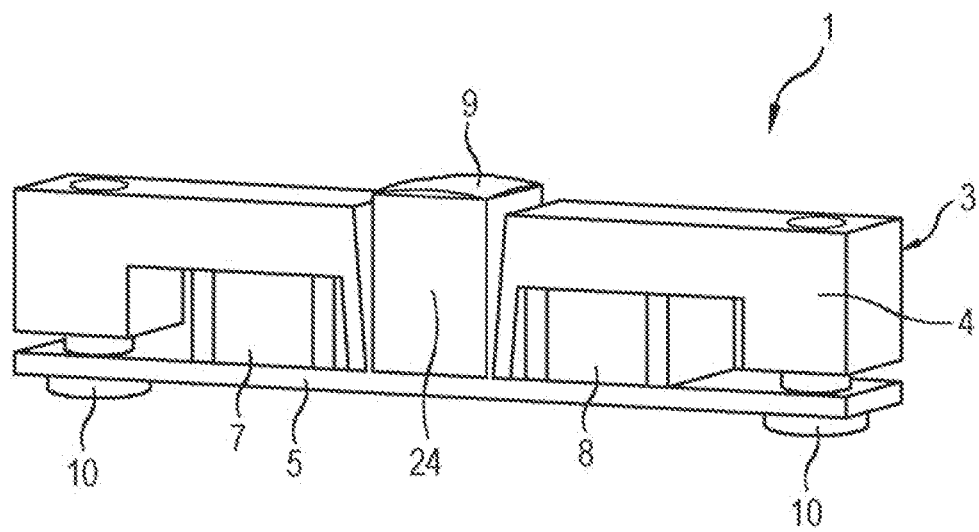
FIG. 17b is a perspective view of a square section of the inertia drive type motor of FIG. 17a, FIG. 18a is a perspective view of an alternative embodiment of an inertia drive type motor.
Figure 17B:
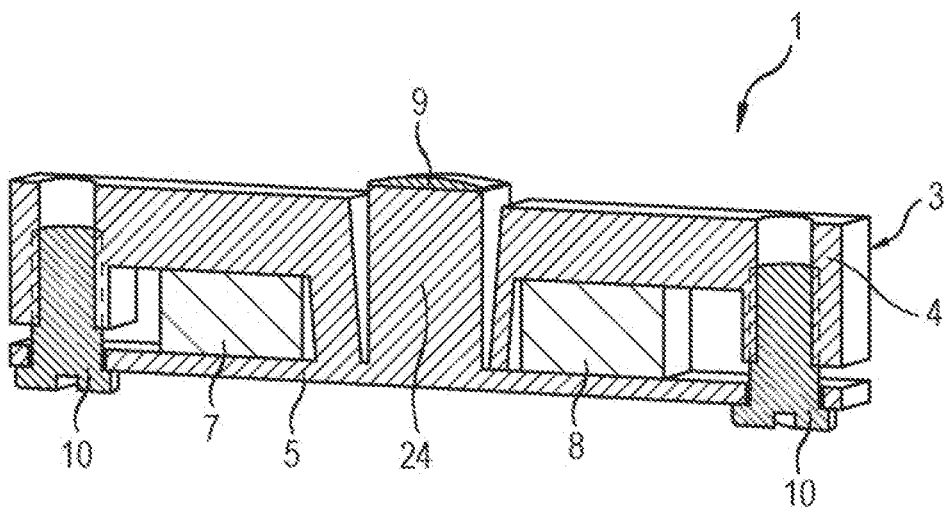

In combination with FIGS. 17a and 17b, an alternative structure of an inertia drive type motor 1 similar to the one described above with FIGS. 16a and 16b is disclosed. In this configuration, the base elements 4.1, 4.2 and lower springs 5 as well as the post 24 are made as one piece. The two piezoelectric actuators 7 and 8 are respectively sandwiched between an upper and lower part of this elastic frame 3. Two screws 10 are used to remove actuators tolerances and hold them sandwiched between parts of the elastic frame 3. As the piezoelectric actuators 7 and 8 expand and shrink simultaneously in the length direction, these deformations are converted into angular movements of the leverage structure, especially the post 24 because of the base elements 4.1 and 4.2 (end masses), the deformations on the actuators 7 and 8 take place at the lower end of the post 24 between the two piezoelectric actuators 7 and 8. This leverage structure amplifies the deformation caused by the actuators 7 and 8 at the end where the friction tip 9 is positioned. The respective hinge point is at the lower end of the post 24. By using drive voltage signals as described above, modification of the trajectories provided for by the friction element 9 can be made.

Figure 18A:
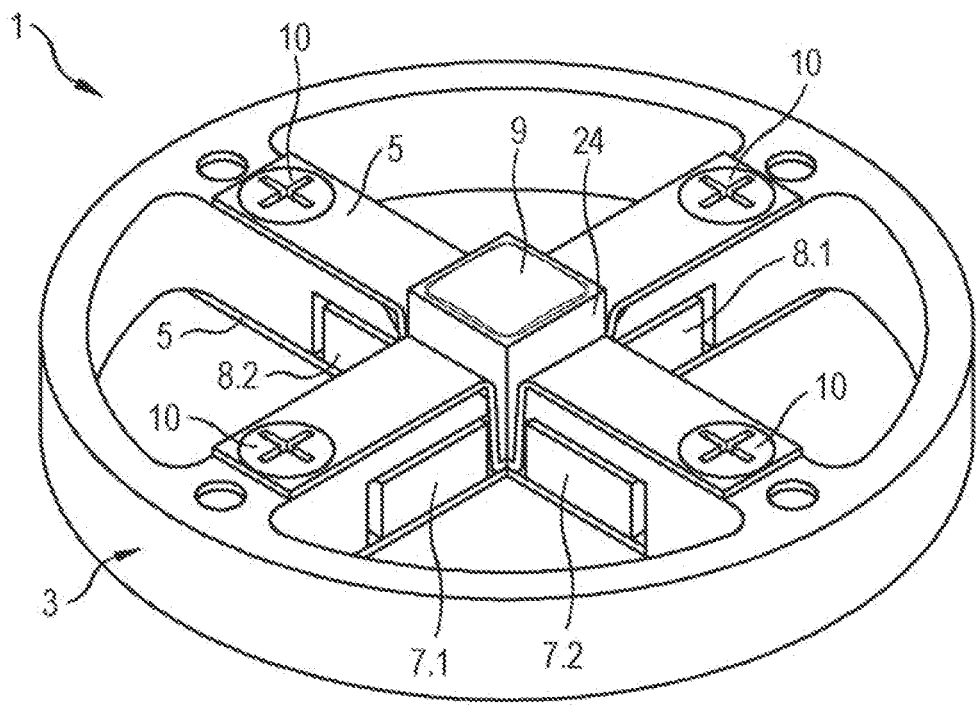
FIG. 18b is a perspective view of a square section of the inertia drive type motor of FIG. 18a, FIG. 19a is a perspective view of a piezoelectric hydraulic actuator.
Figure 18B:
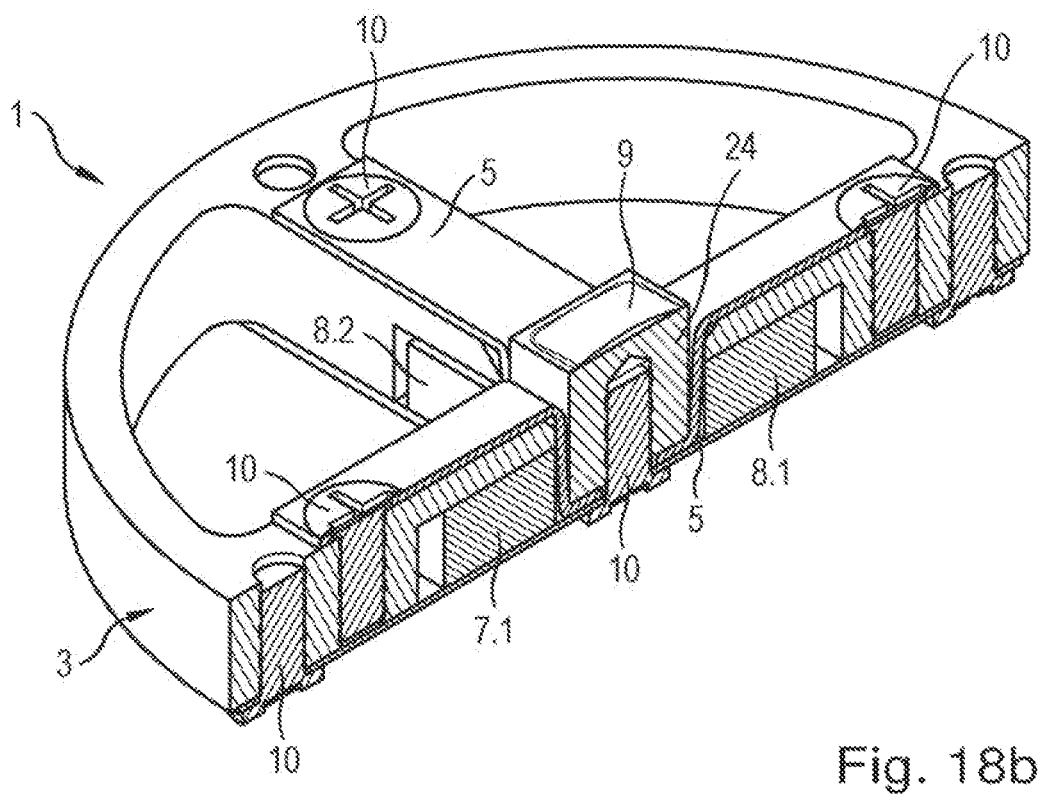

Reference is now made to a further embodiment as shown in FIGS. 18a and 18b.

A similar structure as in the embodiment of FIGS. 16a and 16b has been used. However, the post 24 in the middle is combined with four piezoelectric actuators 7.1, 7.2, 8.1 and 8.2. The elastic frame 3 has the form of a wheel with four spokes and respectively four arms 25. Attached to the spokes of the base element 4 are an upper spring 5 and a lower spring 5. The upper spring 5 also has four spokes which together form a recess in the middle in which the post 24 is located. The lower spring 5 also has four spokes. The spokes of the upper spring 5 and a lower spring 5 are respectively connected by screws to the respective spokes of the base element 4. By properly exciting the piezoelectric actuators 7.1, 7.2, 8.1 and 8.2 in phase or out off phase, movements of the post 24 in various directions can be obtained. The friction element 9 is respectively moved by the post 24 (leverage structure). As a result, an inertia drive type motor 1 is created, which may move a respective slider 2 in two degrees of freedom movement. The corresponding drive voltage signals are respectively synchronized in order to obtain such a movement. Drive voltage signals as described above, which can create a three-dimensional movement of the friction element 9 might be used.

The structure shown in FIGS. 18a and 18b might also be substituted by an elastic frame 3, which is made from one piece similar to the structure as shown in the embodiment of FIGS. 17a and 17b. This means that the two springs 5, the base elements 4 and the post 24 are made from one single piece.

Figure 19A:
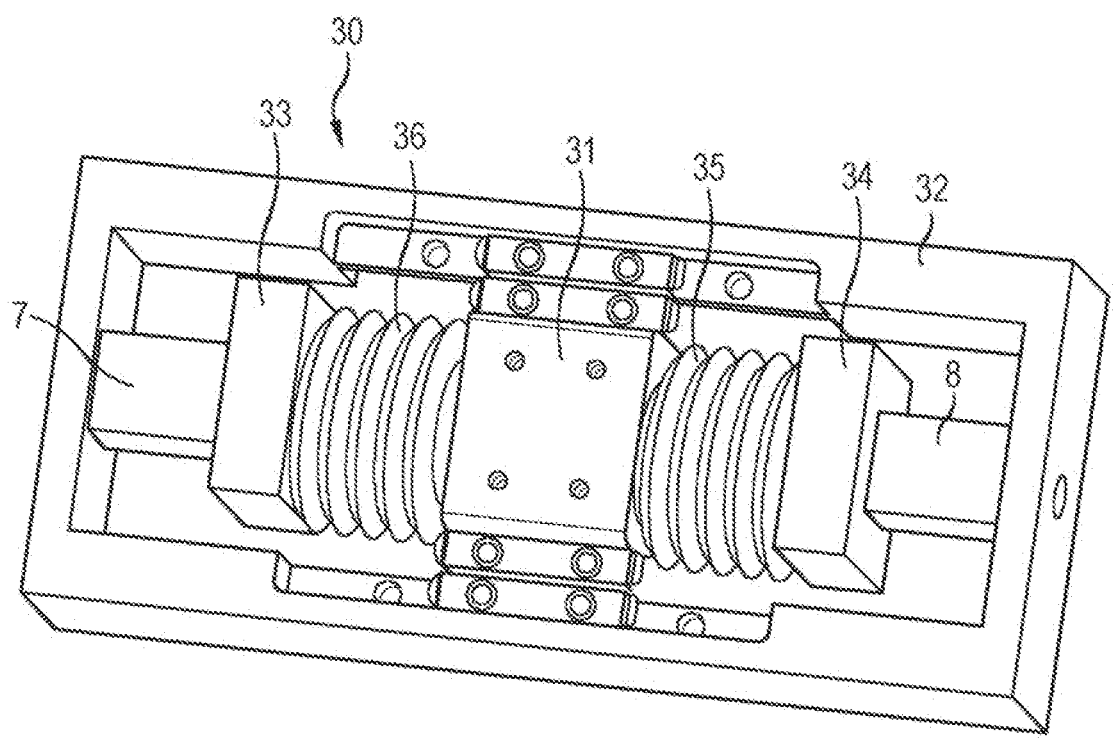
FIG. 19b is a perspective view of a square section of the piezoelectric hydraulic actuator of FIG.
Figure 19B:
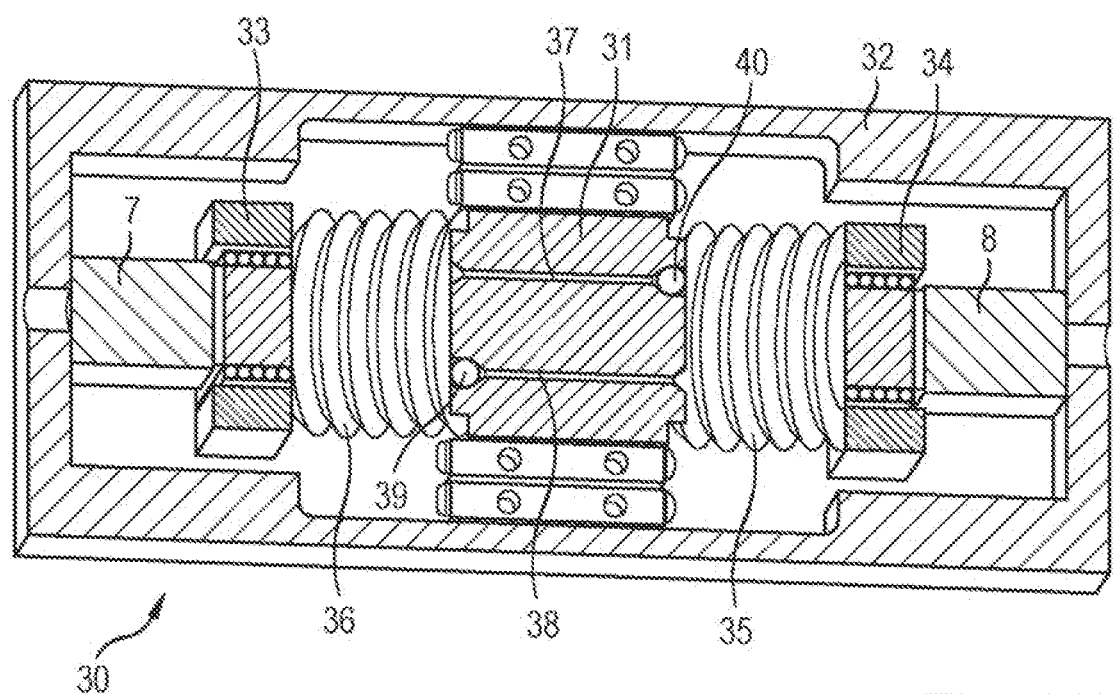

With regard to FIGS. 19a and 19b, a further embodiment is shown. FIGS. 19a and 19b refer to a piezoelectric hydraulic actuator 30 for precisely moving a center mass 31. The piezoelectric hydraulic actuator 30 comprises a stiff frame 32, a first piezoelectric actuator 7 and on the opposite side a second piezoelectric actuator 8, a first coupling element 33, attached to the first actuator 7 and a second coupling element 34 attached to the second piezoelectric actuator 8, as well as a first bellow 35, positioned between the first coupling element 33 and the center mass 31 and a second bellow 36, positioned between the second coupling element 34 and the center mass 31. The center mass 31 comprises two parallel fluid flow channels 37 and 38 oppositely closed at one end by a check valve 39 and 40, respectively. The first and second bellows 35 and 36 are filled with fluid and act as reservoirs. The fluid flow channels 37 and 38 in combination with the respective check valves 39 and 40 are formed like oppositely placed fluid diodes and act as a hydraulic charger or accumulator. The two piezoelectric actuators 7 and 8 may apply pressure to the bellows 35 and 36 simultaneously so that the pressure difference in the bellows creates a fluid flow from one bellow to the other. As a result, a length change of both bellows takes place, one expands and the other shrinks. As a result, a movement of the center mass 31, that is guided by linear bearing within the frame 32 is generated. With two mirrored sawtooth signals, hysteresis of both piezoelectric actuators 7 and 8 would be reduced. In addition during fluid transfer, the response time would be faster while pressure in one side increases due to the expansion of the corresponding piezoelectric actuators 7 or 8, the pressure in the other side decreases due to the shrinkage of the corresponding piezoelectric actuators 7 or 8. These two synchronous motions would cause only one check valve 39 or 40 to open so liquid transfer would only be in one direction. Modification of the first and the second drive voltage signals 13 and 14 is possible as described above to create specific behavior of the piezoelectric hydraulic actuator 30 as shown herein.

The invention claimed is:

1. A method of controlling at least two interacting piezoelectric actuators for commonly displacing an object attached thereto, said method comprising:
   a. Step A: applying a first cyclic drive voltage signal with a constant frequency to a first piezoelectric actuator,
   b. Step B: applying a second cyclic drive voltage signal with a constant frequency to a second piezoelectric actuator, wherein the frequencies of the first and second cyclic drive voltage signals are substantially identical and wherein the frequencies of the first and second cyclic drive voltage signals are substantially oppositely phased, wherein
   at least in a predetermined time period the cyclic drive voltage signals in step A and B are synchronized such that at least one time phase is comprised in which the drive voltage signals of the first and second piezoelectric actuators both have a gradient of decreasing or both have a gradient of increasing the respective drive voltage signal.

2. The method according to claim 1, comprising the following time phases:
   a first time phase in which the drive voltage signal of the first piezoelectric actuator increases from a base voltage to a first upper intermediate voltage lying between the base voltage and a first upper peak voltage or increases from a base voltage to a first upper peak voltage and in which the drive voltage signal from the second piezoelectric actuator decreases from a base voltage to a second lower intermediate voltage lying between the base voltage and a second lower peak voltage or decreases from the base voltage to a second lower peak voltage,
   a second time phase in which the drive voltage signal of the first piezoelectric actuator increases from the first upper intermediate voltage to the first upper peak voltage, or is paused at the first upper peak voltage or decreases from the first upper peak voltage to a first upper intermediate voltage lying between the first upper peak voltage and the base voltage and in which the drive voltage signal from the second piezoelectric actuator increases from the second lower peak voltage to a second lower intermediate voltage lying between the second lower peak voltage and the base voltage or is paused at the second lower peak voltage or decreases from the second lower intermediate voltage to a second lower peak voltage, wherein in the second time phase the drive voltage signals of the first and second piezoelectric actuators both have a gradient of decreasing or both have a gradient of increasing the respective drive voltage signal or one of these gradients is zero and the other is not zero, and
   a third phase in which the drive voltage signal of the first piezoelectric actuator decreases from the first upper peak voltage or the first upper intermediate voltage to a first lower intermediate voltage or a first lower peak voltage and in which the drive voltage of the second piezoelectric actuator increases from the second lower intermediate voltage to a second upper intermediate voltage or a second upper peak voltage.

3. The method according to claim 2, further comprising:
   a fourth time phase in which the drive voltage signal of the first piezoelectric actuator increases from the first lower peak voltage to a first lower intermediate voltage lying between the first lower peak voltage and the base voltage or is paused at the first lower peak voltage or decreases from the first lower intermediate voltage to a first lower peak voltage and in which the drive voltage of the second piezoelectric actuator increases from the second upper intermediate voltage to a second upper peak voltage or is paused at the second upper peak voltage or is decreased from the second upper peak voltage to a second upper intermediate voltage lying between the second upper peak voltage and the base voltage, wherein in the fourth time phase the drive voltage signals of the first and second piezoelectric actuators both have a gradient of decreasing or both have a gradient of increasing the respective drive voltage signal or one of these gradients is zero and the other is not zero or both of these gradients are zero or wherein the fourth time phase is omitted, and
   a fifth time phase in which the drive voltage signal of the first piezoelectric actuator increases from the first lower intermediate voltage or the first lower peak voltage to the base voltage and in which the drive voltage signal of the second piezo electric actuator decreases from the second upper intermediate voltage or the second upper peak voltage to the base voltage.

4. The method according to claim 2, wherein the amount of the gradient of increasing or decreasing the drive voltage signal of the first piezoelectric actuator in the second time phase is smaller than the amount of the gradient of decreasing the drive voltage signal of the first piezoelectric actuator in the third time phase and/or the amount of increasing or decreasing the drive voltage signal of the second piezoelectric actuator in the second time phase is smaller than the amount of the gradient of increasing the drive voltage of the second piezoelectric actuator in the third time phase.

5. The method according to claim 2, wherein the amount of the gradient of increasing the drive voltage signal of the first piezoelectric actuator in the first time phase is different than the amount of the gradient of increasing or decreasing or pausing the drive voltage signal of the first piezoelectric actuator in the second time phase and/or the amount of the gradient of decreasing the drive voltage signal of the second piezoelectric actuator in the first time phase is different than the amount of the gradient of increasing or decreasing or pausing the drive voltage signal of the second piezoelectric actuator in the second time phase.

6. The method according to claim 2, wherein the amount of the first upper peak voltage is different than the amount of the first lower peak voltage and/or the amount of the second upper peak voltage and/or the amount of the second lower peak voltage.

7. The method according to claim 3, wherein the amount of the gradient of increasing or decreasing or pausing the drive voltage signal of the first piezoelectric actuator in the fourth time phase is different than the amount of the gradient of increasing or decreasing the drive voltage signal of the first piezoelectric actuator in the fifth time phase and/or the third time phase and/or the amount of the gradient of increasing or decreasing or pausing the drive voltage signal of the second piezoelectric actuator in the fourth time phase is different than the amount of the gradient of decreasing or decreasing the drive voltage of the second piezoelectric actuator in the fifth time phase and/or the third time phase.

8. The method according to claim 1, wherein the drive voltage signals of the first and second piezoelectric actuators are generated by a cyclic first excitation voltage applied to a first terminal and a cyclic second excitation voltage applied to a second terminal of the first and second piezoelectric actuators and that the amount of an upper peak voltage of the cyclic first excitation voltage is higher than the amount of a lower peak voltage of the cyclic first excitation voltage and the amount of the upper peak voltage of the cyclic second excitation voltage is lower than the amount of the upper peak voltage or the amount of the lower peak voltage of the cyclic first excitation voltage.

9. The method according to claim 8, wherein the upper peak voltage of the cyclic first excitation voltage and the upper peak voltage of the cyclic second excitation voltage are synchronized, and applied at the same time.

10. The method according to claim 1, wherein the object commonly displaced by and attached to the first and second piezoelectric actuators is at least one friction element of an inertia drive motor, wherein the at least one friction element is configured to, at least in a non-operating state of the first and second piezoelectric actuators, be brought into frictional contact with an element to be driven.

11. The method according to claim 10, wherein the inertia drive motor comprises an elastic frame, the at least one frictional element which is arranged on the elastic frame, and the first and second piezoelectric actuators which are configured to cause by interaction the deformation of the elastic frame by use of the corresponding driving voltage signals.

12. The method according to claim 10, wherein the first and second piezoelectric actuators are configured to displace the at least one friction element which is in frictional contact with the element to be driven, in a forward direction in the first time phase, to retract the at least one friction element from the element to be driven in the second time phase and to displace the at least one friction element in the retracted state in a backward direction in the third time phase.

13. The method according to claim 11, wherein the elastic frame is attached to a part of a leverage structure including a post on which the at least one frictional element is disposed, and the deformation of the elastic frame caused by interaction of the first and second piezoelectric actuators is amplified and translated to the at least one frictional element by the leverage structure.

14. The method according to claim 10, wherein at least three piezoelectric actuators are provided which are configured to commonly displace and be attached to the at least one frictional element, wherein the piezoelectric actuators are controlled by their corresponding drive voltage signals to displace the at least one frictional element in x-direction and z-direction as well as to retract the at least one friction element from the element to be driven in y-direction.

15. The method according to claim 1, wherein the object commonly displaced by and attached to the first and second piezoelectric actuators is a center moving mass of a piezoelectric hydraulic actuator.

16. An assembly comprising two interacting first and second piezoelectric actuators, a displaceable object attached to the first and second piezoelectric actuators, means for applying and controlling cyclic drive voltage signals for controlling the interaction of the first and second piezoelectric actuators for displacing the object, wherein the means for applying and controlling is configured to perform the method according to claim 1.

17. The assembly according to claim 16, wherein a drive electronic with two signal sources is provided, each signal source having an active and a passive terminal, wherein only the active terminals are electrically connected to either the positive or the negative terminals of the piezoelectric actuators, and that the others of the positive or the negative terminals of the piezoelectric actuators are electrically connected to each other so that they are floating, and that the passive terminals of the two signal sources are connected to ground.

* * * * *